US012777555B2

(12) United States Patent
Yan et al.

(10) Patent No.: US 12,777,555 B2
(45) Date of Patent: Oct. 27, 2026

(54) METHOD AND SYSTEM FOR DYNAMIC EXTENDED DISCONTINUOUS RECEPTION SERVICE

(71) Applicant: Verizon Patent and Licensing Inc., Basking Ridge, NJ (US)

(72) Inventors: Lixia Yan, Basking Ridge, NJ (US); Violeta Cakulev, Millburn, NJ (US); Lalit R. Kotecha, San Ramon, CA (US); Ce Xu, Campbell, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 249 days.

(21) Appl. No.: 18/643,027

(22) Filed: Apr. 23, 2024

(65) Prior Publication Data

US 2025/0331057 A1 Oct. 23, 2025

(51) Int. Cl.

| | |
|---|---|
| ***H04W 76/28*** | (2018.01) |
| ***H04L 43/0882*** | (2022.01) |
| ***H04M 15/00*** | (2024.01) |
| ***H04W 24/02*** | (2009.01) |

(52) U.S. Cl.

CPC ......... *H04W 76/28* (2018.02); *H04L 43/0882* (2013.01); *H04M 15/66* (2013.01); *H04W 24/02* (2013.01)

(58) Field of Classification Search

CPC ... H04L 43/0882; H04L 41/14; H04L 43/065; H04M 15/66; H04W 24/02; H04W 76/28; H04W 60/00

See application file for complete search history.

(56) References Cited

U.S. PATENT DOCUMENTS

| | | | | |
|---|---|---|---|---|
| 2017/0280419 | A1* | 9/2017 | Johansson | H04W 68/04 |
| 2020/0045753 | A1* | 2/2020 | Dao | H04W 4/08 |
| 2021/0084173 | A1* | 3/2021 | Sun | H04L 12/1407 |
| 2022/0070963 | A1* | 3/2022 | Ianev | H04L 41/14 |
| 2022/0151014 | A1* | 5/2022 | Kedalagudde | H04W 76/19 |
| 2024/0179792 | A1* | 5/2024 | Höglund | H04W 76/28 |
| 2024/0314696 | A1* | 9/2024 | Pan | H04W 52/0248 |
| 2026/0032554 | A1* | 1/2026 | Kim | H04L 41/0894 |

* cited by examiner

*Primary Examiner* — Rushil P. Sampat

(57) ABSTRACT

A method, an end device, and a non-transitory computer-readable storage medium are described in relation to a dynamic eDRX service. The dynamic eDRX service may dynamically update eDRX cycle parameters based on network information. The network information may relate to a congestion state, a data usage value, or another criteria. The dynamic eDRX service may transmit the updated eDRX cycle parameters to an end device of relevance.

20 Claims, 4 Drawing Sheets

METHOD AND SYSTEM FOR DYNAMIC EXTENDED DISCONTINUOUS RECEPTION SERVICE

BACKGROUND

Extended discontinuous reception (eDRX) is a process of turning on and turning off a radio receiver of a wireless end device according to a schedule that is coordinated between a wireless network and the wireless end device. In this way, the wireless device does not need to continuously monitor control channels for messages, and can reduce power consumption and extend battery life.

DETAILED DESCRIPTION

Figure 1:
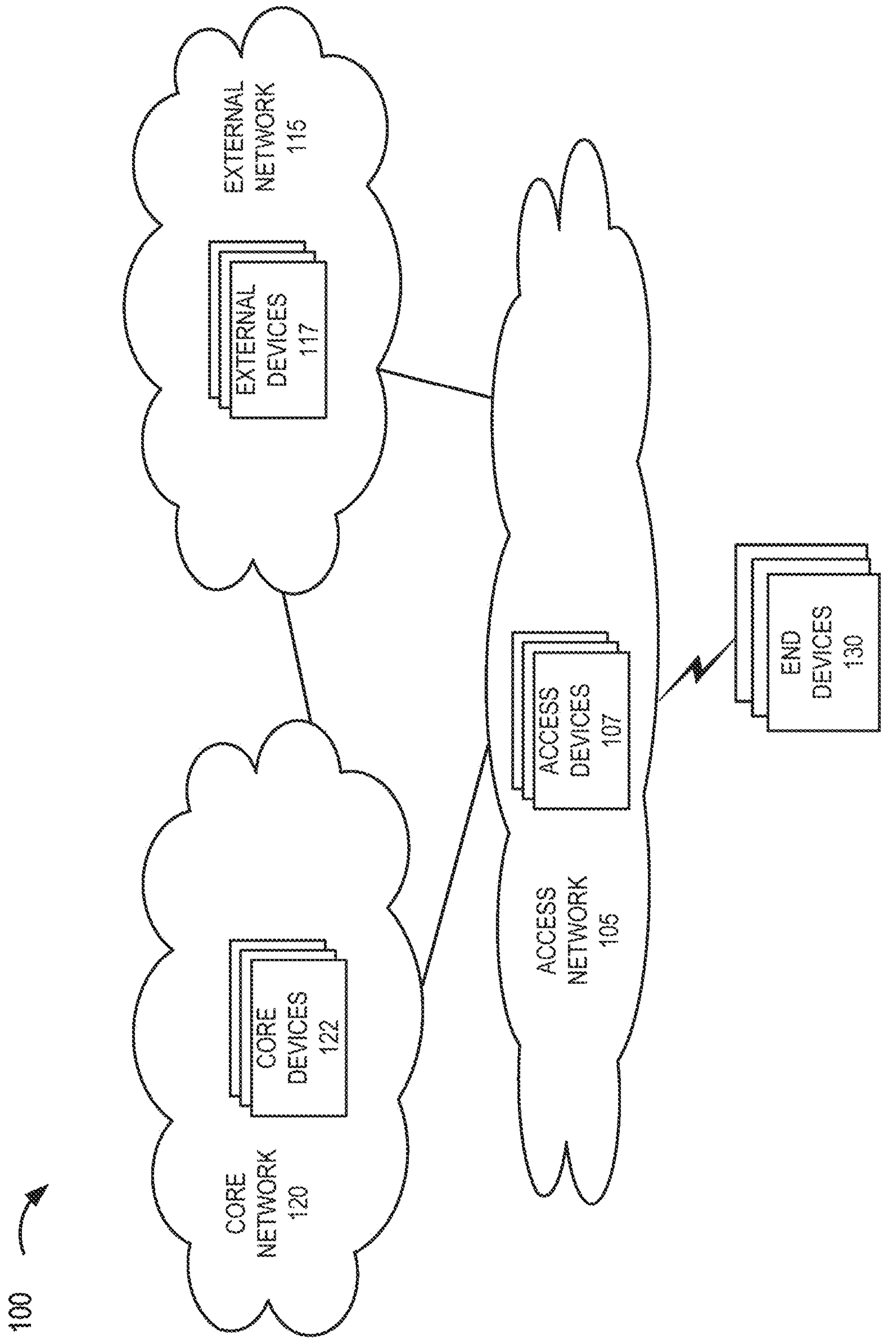
FIG. 1 is a diagram illustrating an exemplary environment in which an exemplary embodiment of a dynamic eDRX service may be implemented.

The following detailed description refers to the accompanying drawings. The same reference numbers in different drawings may identify the same or similar elements. Also, the following detailed description does not limit the invention.

eDRX may be implemented for machine-to-machine (M2M) and/or Internet of Things (IoT) devices (e.g., a Narrowband IoT device, a Long Term Evolution Machine Type Communication (LTE-MTC or LTE-M) device, etc.), in which battery life can be particularly important, as well as other types of end devices (e.g., low power wide area (LPWA) technologies) that may need to infrequently communicate via the wireless network. eDRX enables application developers (e.g., IoT application developers, etc.) to set and later change how long an end device may stay in low-power sleep mode before it wakes up. Since an end device is not reachable when it is sleeping, the time to reach the end device depends on how long the application developer sets the eDRX cycle (i.e., the length of time the end device is asleep). The eDRX cycle may precede or follow a paging time window (PTW) during which the end device may be reachable by the wireless network and may receive incoming traffic, for example.

Typically, in a Fifth Generation (5G) network environment, eDRX cycle parameters are stored in the 5G core network, such as a unified data repository (UDR) or a unified data management (UDM), for example. The ability to dynamically set or update eDRX cycle parameters on a per end device or group of end devices basis is difficult via the UDR or UDM. Additionally, an application of the end device may attempt to set or change the eDRX cycle parameters (e.g., relative to the eDRX cycle parameters stored in the network) and request the network to accept the eDRX cycle parameters. Typically, however, the eDRX cycle parameters are static, as stored in the UDR/UDM, and the network may not accept eDRX cycle parameters that are different from those stored in the network. In this regard, the eDRX cycle parameters are static in nature and are not dynamic, let alone dynamically set in view of network-side considerations, such as congestion, subscription parameters, and/or another type of network-side state, context, factor, and so forth.

According to exemplary embodiments, a dynamic eDRX service is described. According to an exemplary embodiment, the dynamic eDRX service may include implementation by a core network device, such as policy control device. For example, the policy control device may be implemented as a policy control function (PCF), a split PCF (e.g., an access and mobility management (AM-PCF), a user equipment (UE-PCF), etc.), a similar type of future generation policy control device or function, or a legacy policy control device or function (e.g., a policy control rules function (PCRF)).

According to an exemplary embodiment, the dynamic eDRX service may dynamically calculate and update eDRX cycle parameters in response to a triggering event, as described herein. For example, the triggering event may relate to a network condition, such as a congestion state and/or a performance metric in the radio access network (RAN) and/or at a RAN device. According to another example, the triggering event may relate to data usage associated with the end device relative to its permitted data usage allowance. According to yet another example, the triggering event may relate to a number of end devices attached to a RAN device. According to still other examples, the triggering event may relate to some other configurable factor that may be impacted by the eDRX cycle parameters. According to an exemplary embodiment, the triggering event may include communication from another core device to the policy control device, as described herein.

According to other exemplary embodiments, the dynamic eDRX service may pertain to DRX in which DRX cycle parameters may be dynamically configured in response to the triggering event.

According to an exemplary embodiment, the dynamic eDRX service may include providing eDRX cycle parameters to the end device. For example, the dynamical set, calculated, or updated eDRX cycle parameters may be communicated to the end device via a RAN device, and adhered to or followed.

In view of the foregoing, the dynamic eDRX service may enable a network or a network device to dynamically configure eDRX cycle parameters based on a variety of network factors, states, or contexts, as described herein. As a consequence, the dynamic eDRX service may improve network operability, end device management, network performance, and other aspects of network-side and/or end device-side wireless services.

FIG. 1 is a diagram illustrating an exemplary environment 100 in which an exemplary embodiment of the dynamic eDRX service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually and generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an end device application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the dynamic eDRX service may use at least one of these planes of communication.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. According to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

External network 115 may include one or multiple networks of one or multiple types and technologies that provide an end device application service. For example, external network 115 may be implemented using one or multiple technologies including network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of end device application services. For example, the end device application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (IoT) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) network of an LTE network, an LTE-Advanced (LTE-A) network, and/or an LTE-A Pro network, a future generation core network (e.g., a 5G Advanced, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a UDM, a UDR, an authentication server function (AUSF), a security anchor function (SEAF), a network exposure function (NEF), a network slice selection function (NSSF), a network repository function (NRF), a PCF, a network data analytics function (NWDAF), a service capability exposure function (SCEF), a lifecycle management (LCM) device, a mobility management entity (MME), a packet data network (PDN) gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a PCRF, a policy and charging enforcement function (PCEF), a charging function (CHF), a charging system (CS), and/or a future generation core network device that may provide similar functions and/or services as those described herein.

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, 6G and 7G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, a converged charging system (CCS), etc.). Also, core devices 122 may include a split core device 122. For example, core devices 122 may include a session management (SM) PCF, an AM PCF, a user equipment (UE) PCF, and/or another type of split architecture associated with another core device 122, as described herein.

According to an exemplary embodiment, at least some of core devices 122 may include logic of the dynamic eDRX service. For example, core device 122 may dynamically calculate eDRX cycle parameters. According to various exemplary embodiments, core device 122 may dynamically calculate and provide the eDRX cycle parameters to end device 130 during or as a part of various network procedures and/or end device connection states or activities. For example, core device 122 may perform or provide the dynamic eDRX service as a part of a initial registration, authentication, or attachment procedure, during a packet data unit (PDU) session, as a part of a PDU session establishment procedure, or during other types of network procedures, end device state or mode, and so forth.

According to an exemplary embodiment, core device 122 may dynamically calculate the eDRX cycle parameters based on network information received from or originated from another core device 122, such as an NWDAF, a CHF, or another core device 122 that may include logic that supports the eDRX dynamic service, as described herein.

According to an exemplary embodiment, the network information may pertain to a current or a prospective network condition or state, such as congestion (e.g., congestion in access network 105, at access device 107, in an X-haul network, in core network 120, at core device 122 (e.g., UPF, PGW, etc.), etc.). For example, the NWDAF or similar functioning network device may provide the network information to the policy control device. According to another example, the network information may pertain to a current or a prospective performance metric value, such as an underperforming performance metric value (e.g., relating to throughput, bitrate, latency, packet error rate, packet drop, etc.) relative to a performance metric threshold value. End device 130 may attribute or contribute to the underperforming performance metric value. According to another exemplary embodiment, the network information may relate to data usage associated with end device 130. For example, the CHF or the like may determine that end device 130 has reached or exceeded a data usage limit (e.g., monthly or relative to another time frame) and provide the network information to the policy control device. Similarly, when congestion abates or worsens in the network or at a network device or data usage is reset (e.g., a next billing cycle or according to another type of charging framework) or continues to increase despite a previous change to the eDRX cycle parameters, the network information may indicate this information, and the policy control device may dynamically calculate the eDRX cycle parameters, as described herein According to an exemplary embodiment, core device 122 may dynamically calculate the eDRX cycle parameters based on policies or rules pertaining to the derivation or generation of the (new) eDRX cycle parameters in view of the network information. For example, depending on the severity of the network congestion, core device 122 may store and use different policies and/or rules as a basis to calculate the eDRX cycle parameters. The eDRX cycle parameters may include a parameter that indicates a time period or duration for sleep by end device 130. The eDRX cycle parameters may include a parameter that indicates a duration and/or timing of a paging time window.

According to an exemplary embodiment, core device 122 may provide the calculated eDRX cycle parameters to end device 130 via access device 107. According to various exemplary embodiments, core device 122 that provides the dynamic eDRX service may be implemented as a PCF, a split PCF, a future generation or a legacy policy control device, as described herein.

According to an exemplary embodiment, other types of core devices 122 may include logic of the dynamic eDRX service and/or support the dynamic eDRX service. For example, an AMF, an NWDAF, a CHF, a UDM/UDR, a similar functioning future generation network (core) device, or a similar functioning legacy network (core) device (e.g., an MME, an HSS, a multi-RAT core device, a CS, a CCS, a charging rules function (CRF), etc.) may include logic of the dynamic eDRX service and/or support the dynamic eDRX service (e.g., communication to a PCF regarding a triggering event, etc.), as described herein.

End device 130 may include a device that may have computational and communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, or another type of UE.

End device 130 may be configured to execute various types of software (e.g., applications, programs, etc.). The number and the types of software may vary among end devices 130. For example, end device 130 may host one or multiple end device applications that may relate to various types of application services described in relation to external devices 117. For example, the end device application may pertain to IoT, extreme real-time communications, gaming, voice, video-calling, navigation, ultra-reliable communications, and so forth. The end device application may include a client-side application.

End device 130 may include "edge-aware" and/or "edge-unaware" application service clients. For purposes of description, end device 130 is not considered a network device. End device 130 may be implemented as a virtualized device in whole or in part.

Figure 2:
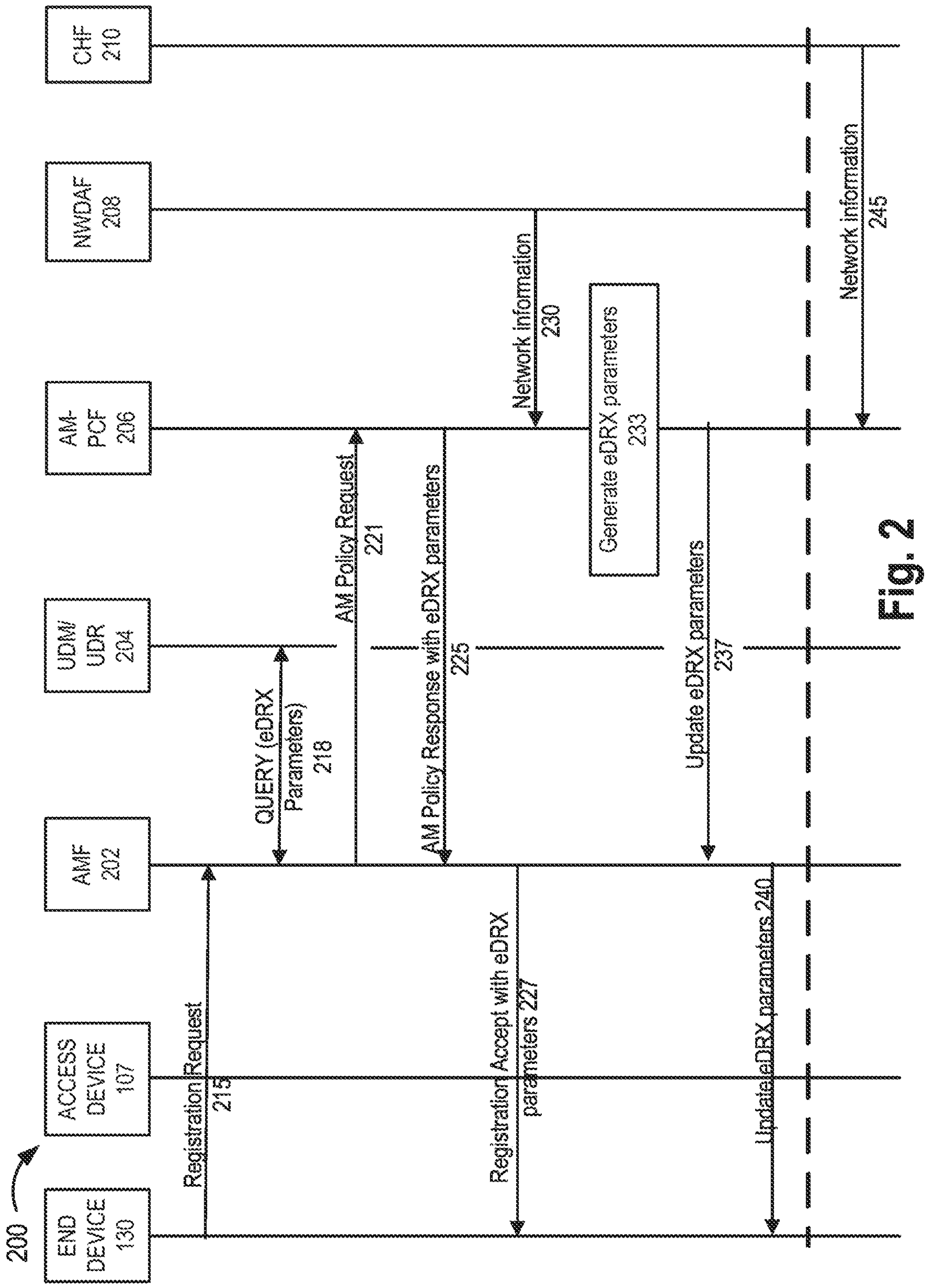
FIG. 2 is a messaging diagram illustrating an exemplary process of an exemplary embodiment of the dynamic eDRX service according to an exemplary scenario.

FIG. 2 is a messaging diagram illustrating an exemplary process of an exemplary embodiment of the dynamic eDRX service according to an exemplary scenario and environment. As illustrated, exemplary environment may include end device 130, access device 107, an AMF 202, a UDM/UDR 204, an AM-PCF 206, an NWDAF 208, and a CHF 210. The environment depicted in FIG. 2 is exemplary and according to other embodiments, the environment may include additional, different, and/or fewer network devices. For example, according to other exemplary embodiments, the environment may include another type of core device 122 than those illustrated and described in relation to FIG. 2.

AMF 202, UDM/UDR 204, AM-PCF 206, NWDAF 208, and CHF 210 or a subset thereof may provide a function and/or a service in accordance with a network standard, such as Third Generation Partnership Project (3GPP), 3GPP2, International Telecommunication Union (ITU), European Telecommunications Standards Institute (ETSI), GSM Association (GSMA), or the like and/or of a proprietary nature. According to an exemplary embodiment, AMF 202, UDM/UDR 204, AM-PCF 206, NWDAF 208, and CHF 210 or a subset thereof may include logic of an exemplary embodiment of the dynamic eDRX service and/or provide support for a process of the dynamic eDRX service. For example, AMF 202, UDM/UDR 204, AM-PCF 206, NWDAF 208, and CHF 210 or a subset thereof may perform a function, an operation, and/or a service that is beyond a function and/or service associated with the network standard.

The messages described and illustrated are exemplary. For the sake of brevity, some operations and messages, which may relate to the network standard (e.g., in relation to an (initial) registration procedure or another network procedure, such as authentication, etc.), have been omitted. According to other exemplary scenarios, updated eDRX cycle parameters may be generated and provided to end device 130 as a part of an initial or mobility registration procedure or another type of network procedure or time of end device connectivity, as described herein.

Referring to FIG. 2, although not illustrated, end device 130 may establish a radio resource connection (RRC) with access device 107. Thereafter, end device 130 may generate and transmit a registration request 215 to access device 107. Registration request 215 may or may not include preferred eDRX parameters/values. Access device 107 may receive, read, and analyze registration request 215, and in response, generate and transmit a registration request 218 to AMF 202. In response to receiving and reading and/or analyzing registration request 218, AMF 202 may query 218 to UDM/UDR 204 for eDRX parameters pertaining to end device 130. Based on query 218, AMF 202 may obtain the eDRX cycle parameters stored by UDM/UDR 204.

In response, AMF 202 may generate and transmit an AM policy request 221 to AM-PCF 206. AM policy request 221 may include a request to obtain access and mobility control policies, an identifier of end device 130, and potentially other types of data, such as allowed network slice information, applicable RAT types, user location, access type, and so forth. According to some exemplary scenarios, AM policy request 221 may include end device requested eDRX parameters. In response to receiving and reading and/or analyzing request 221, although not illustrated, AM-PCF 206 may obtain subscription data pertaining to end device 130 from UDM/UDR 204.

AM-PCF 206 may make the requested policy decision including access and mobility control policy information (e.g., service area restrictions and/or RAT frequency selection priority (RFSP) index) and, according to this example, eDRX parameters. AM-PCF 206 may generate and transmit an AM Policy Response with eDRX parameters 225 to AMF 202. In response to receiving and reading and/or analyzing AM Policy Response 225, AMF 202 may generate and transmit a Registration Accept 227, which includes the eDRX parameters, to end device 130 via access device 107.

According to this exemplary scenario, assume that a portion of access network 105enters a congested state and/or access device 107 to which end device 130 is connected is congested. Although not illustrated, NWDAF 208 may obtain and analyze congestion-related information and determine congestion. For example, the congestion-related information may include end device location information. The congestion-related information may include performance measurements relating to throughput, data radio bearer (DRB) setup, number of RRC connections, radio resource utilization values, and so forth. The congestion may relate to the user plane, the control plane, or both.

In response, NWDAF 208 may generate and transmit a message 230, which includes network information indicating the congested state, to AM-PCF 206, as illustrated. The network information may include current or predicted congestion for a specific location, a specific end device 130, or group of end devices 130, a congestion level, a type of congestion (e.g., user plane, control plane, etc.), application service information regarding traffic in the uplink and/or downlink (e.g., application identifier, throughput values, etc.), and other type of information (e.g., applicable time window to which the network information applies, etc.).

In response to receiving and reading and/or analyzing message 230, AM-PCF 206 may determine that the eDRX parameters should be updated for end device 130. AM-PCF 206 may generate updated eDRX cycle parameters 233 based on the network information and policies and/or rules (e.g., local and/or operator-based) pertaining to calculating updated eDRX cycle parameters. In response to the generation of the updated eDRX parameters, AM-PCF 206 may generate and transmit an update eDRX parameters message 237 to AMF 202. As further illustrated, AMF 202 may forward update eDRX parameters message 240 (or generate a new message 240) to end device 130 via access device 107. End device 130 may update its eDRX parameters in response to receiving update eDRX parameters message 240.

As further shown in FIG. 2, according to another exemplary scenario, CHF 210 may generate and transmit network information 245 to AM-PCF 206 (e.g., via an SMF (not illustrated)), which may trigger an update to the eDRX parameters for end device 130. For example, assume end device 130 is configured with a data usage limit (e.g., on a per month basis), and the eDRX cycle is pre-configured (e.g., a particular time period) in UDM/UDR 204. Subsequently, end device 130 may meet the data usage limit before the month's end or within a certain portion of the data usage limit. CHF 210 may provide this network information to AM-PCF 206. For example, the network information may include a data usage value, allowed or permitted data usage value, etc. In a similar manner, AM-PCF 206 may generate updated eDRX parameters for end device 130 based on the network information from CHF and network policies and/or rules pertaining to calculating updated eDRX parameters. According to some exemplary implementations, the policies and/or rules may correspond to different data usage values, which may yield different updated eDRX parameters. The updated eDRX parameters may be provided to end device 130. When the data usage is reset for end device 130 (e.g., a new month), CHF 210 may notify AM-PCF 206 that the data usage limit is reset, and AM-PCF 206 may generate and provide the updated eDRX parameters to the previously preconfigured values.

Figure 3:
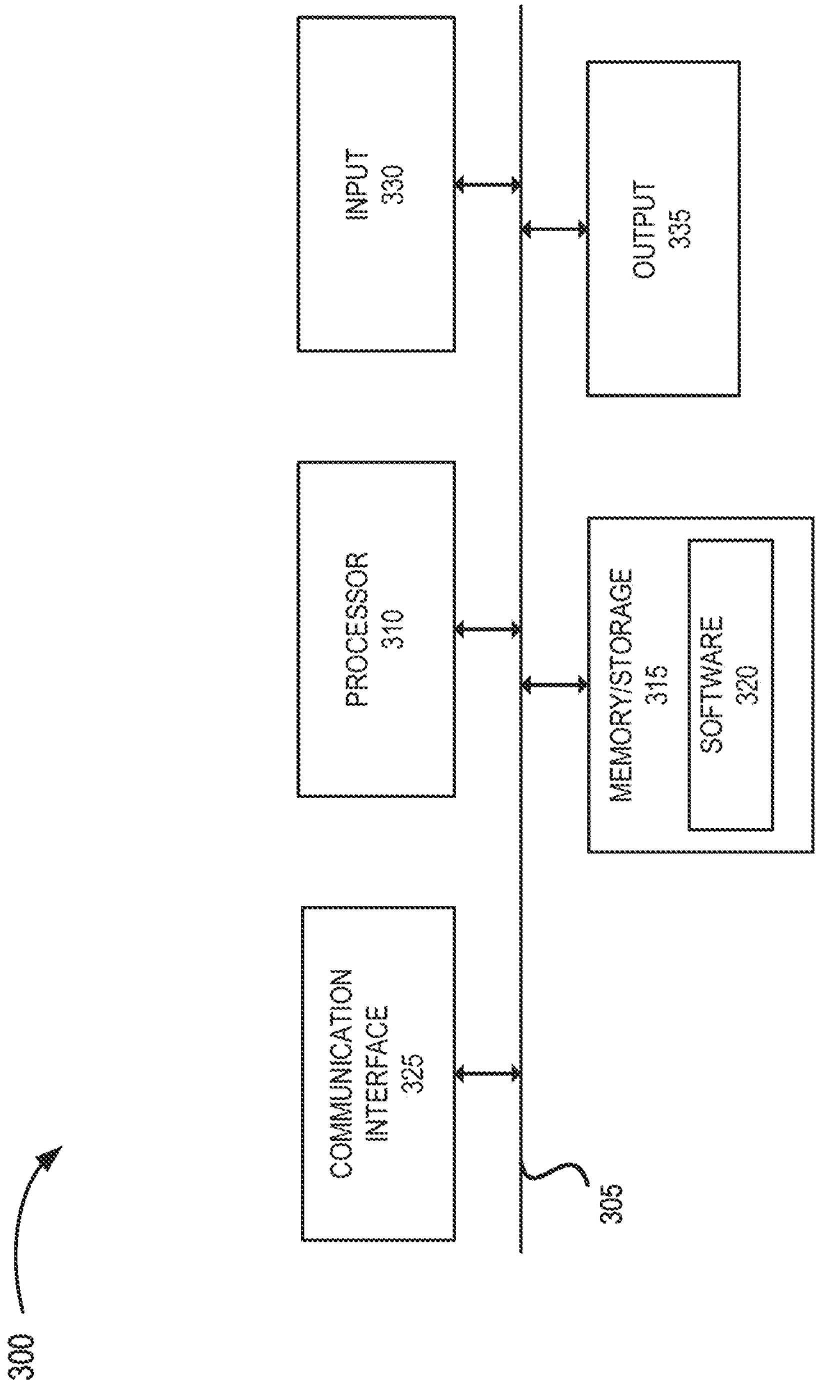
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, AM-PCF 206, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to a PCF, software 320 may include an application that, when executed by processor 310, provides a function and/or a process of the dynamic eDRX service, as described herein. Software 320 may also include firmware, middleware, microcode, hardware description language (HDL), and/or another form of instruction. Software 320 may also be virtualized. Software 320 may further include an operating system (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers, an antenna, and the like. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function, an operation, or a process described herein. Alternatively, for example, according to other implementations, device 300 may be configured to perform a function, an operation, or a process described herein based on the execution of hardware (processor 310, etc.).

Figure 4:
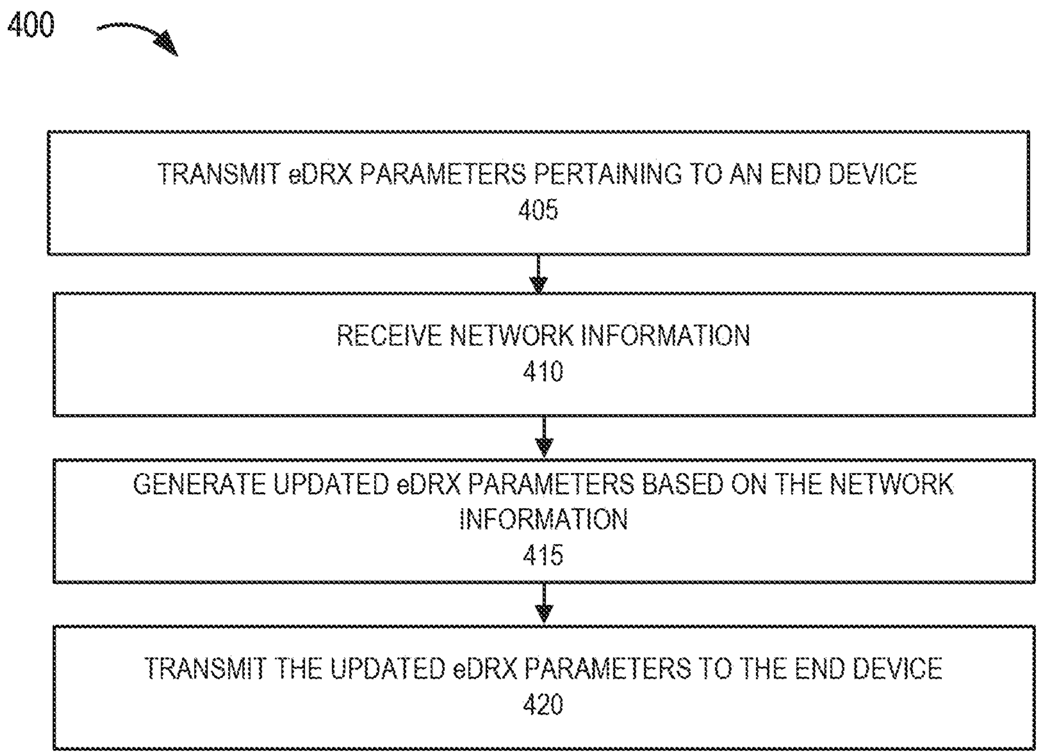
FIG. 4 is a flow diagram illustrating an exemplary process of an exemplary embodiment of the dynamic eDRX service.

FIG. 4 is a flow diagram illustrating an exemplary process 400 of an exemplary embodiment of the dynamic eDRX service. According to an exemplary embodiment, a policy control device/function may perform steps of process 400. According to an exemplary implementation, a processor may execute software to perform a step (in whole or in part) of process 400, as described herein. Alternatively, a step (in whole or in part) may be performed by execution of only hardware. Process 400 is described as being performed by a PCD (e.g., a PCF, a split PCF, etc.), as described herein.

In block 405, a PCD may transmit eDRX parameters pertaining to end device 130. For example, the PCD may determine applicable eDRX parameters and transmit the eDRX parameters towards end device 130 via an intermediary core device 122, such as an AMF.

In block 410, the PCD may receive network information. For example, the PCD may receive the network information from another core device 122, such as an NWDAF or a charging device. The network information may pertain to congestion or data usage and end device 130, for example.

In block 415, the PCD may generate updated eDRX parameters based on the network information. For example, the PDC may generate the updated eDRX parameters based on congestion-related information or data usage values (and policies/rules regarding such generation).

In block 420, the PCD may transmit the updated eDRX parameters pertaining to end device 130. For example, the PCD may transmit the updated eDRX parameters towards end device 130 via an intermediary core device 122, such as an AMF.

FIG. 4 illustrates an exemplary process 400 of the dynamic eDRX service, however, according to other exemplary embodiments, the dynamic eDRX service may perform additional operations, fewer operations, and/or different operations than those illustrated and described in relation to FIG. 4. For example, access device 107 and end device 130 may use and/or enforce the updated eDRX parameters. According to another example, block 405 may be omitted. For example, the PCD may blocks 410-420 during an initial registration procedure associated with end device 130.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 4, the order of the blocks may be modified according to other embodiments. Further, non-dependent blocks may be performed in parallel.

Additionally, other processes described in this description may be modified and/or non-dependent operations may be performed in parallel. Also, with reference to the processes described herein, a component of end device 130, such as an operating system and/or a modem, are exemplary.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

transmitting, by a network device, extended discontinuous reception (eDRX) parameters pertaining to an end device, to a first network device;

receiving, by the network device from a second network device, network information, generated by the second network device that pertains to the end device and congestion of a radio access network or a core network to which the end device is connected;

generating, by the network device based on the network information, updated eDRX parameters pertaining to the end device that differ from the eDRX parameters; and transmitting, by the network device to the first network device, the updated eDRX parameters.

2. The method of claim 1, wherein the network information pertains to congestion of a radio access network device of the radio access network to which the end device is connected.

3. The method of claim 1, wherein the second network device includes a network data analytics function (NWDAF).

4. The method of claim 1, wherein the network information pertains to data usage associated with the end device.

5. The method of claim 1, wherein the second network device includes a charging function.

6. The method of claim 1, further comprising:

obtaining, by the network device, subscription information that includes the eDRX parameters.

7. The method of claim 1, wherein the generating further comprises:

generating, by the network device based on the network information and rules for calculating the updated eDRX parameters, the updated eDRX parameters.

8. The method of claim 1, wherein the network device comprises a policy control function (PCF) or a split PCF.

9. A network device comprising:

a processor, wherein the processor is configured to:

transmit extended discontinuous reception (eDRX) parameters pertaining to an end device, to a first network device;

receive, from a second network device, network information, generated by the second network device that pertains to the end device and congestion of a radio access network or a core network to which the end device is connected;

generate, based on the network information, updated eDRX parameters pertaining to the end device that differ from the eDRX parameters; and transmit, to the first network device, the updated eDRX parameters.

10. The network device of claim 9, wherein the network information pertains to congestion of a radio access network device of the radio access network to which the end device is connected.

11. The network device of claim 9, wherein the second network device includes a network data analytics function (NWDAF).

12. The network device of claim 9, wherein the network information pertains to data usage associated with the end device.

13. The network device of claim 9, wherein the second network device includes a charging function.

14. The network device of claim 9, wherein the processor is further configured to:

obtain subscription information that includes the eDRX parameters.

15. The network device of claim 9, wherein the processor is further configured to:

generate, based on the network information and rules for calculating the updated eDRX parameters, the updated eDRX parameters.

16. The network device of claim 9, wherein the network device comprises a policy control function (PCF) or a split PCF.

17. A non-transitory computer-readable storage medium storing instructions executable by a processor of a network device, wherein the instructions are configured to:

transmit extended discontinuous reception (eDRX) parameters pertaining to an end device, to a first network device;

receive, from a second network device, network information, generated by the second network device that pertains to the end device and congestion of a radio access network or a core network to which the end device is connected;

generate, based on the network information, updated eDRX parameters pertaining to the end device that differ from the eDRX parameters; and transmit, to the first network device, the updated eDRX parameters.

18. The non-transitory computer-readable storage medium of claim 17, wherein the network information pertains to congestion of a radio access network device of the radio access network to which the end device is connected.

19. The non-transitory computer-readable storage medium of claim 17, wherein the instructions are further configured to:

generate, based on the network information and rules for calculating the updated eDRX parameters, the updated eDRX parameters.

20. The non-transitory computer-readable storage medium of claim 17, wherein the network information pertains to data usage associated with the end device.

* * * * *